United States Patent [19]

Terner

[11] 3,955,956
[45] May 11, 1976

[54] PROCESS FOR PRODUCING GLASS ARTICLES

[75] Inventor: Emanuel M. Terner, Oakhurst, N.J.

[73] Assignee: Midland Glass Company, Inc., Cliffwood, N.J.

[22] Filed: Aug. 6, 1975

[21] Appl. No.: 602,262

[52] U.S. Cl. ................................. 65/134; 65/21; 106/DIG. 8
[51] Int. Cl.² ........................................... C03B 5/16
[58] Field of Search ............ 106/DIG. 8; 65/21, 27, 65/134, 137

[56] References Cited
UNITED STATES PATENTS

| | | | |
|---|---|---|---|
| 2,233,435 | 3/1941 | Snow | 65/134 X |
| 3,232,731 | 2/1966 | Malicheff | 65/27 |
| 3,248,191 | 4/1966 | Canifield | 65/134 X |
| 3,607,189 | 9/1971 | Manring | 65/134 |

Primary Examiner—Robert L. Lindsay, Jr.
Attorney, Agent, or Firm—Ryder, McAulay, Fields, Fisher & Goldstein

[57] ABSTRACT

A process for producing glass articles, particularly glass containers, comprises heating glass raw materials in a first location until the glass has been refined to approximately 60 to 95% of complete refining, cooling the molten batch and converting the semi-refined glass to a granular state, transporting the glass to a site for completion of refining and transforming of the glass into a finished glass product.

9 Claims, 2 Drawing Figures

PROCESS FOR PRODUCING GLASS ARTICLES

FIELD OF THE INVENTION

The production of glass articles requires three major raw materials: a source of silica, a source of alkali, and energy. Generally, glass objects, particularly glass containers, are produced near large population centers where they are primarily utilized. Since these large population centers are normally not near the sources of raw material, the raw materials must be transported to a site where they are refined into glass, formed into the glass articles, and then transported to their point of utilization.

Because of the necessity for transporting these large quantities of raw materials from their point of availability to their point of use, the overall process is not as economical as it might be. Particularly at this time with the extremely high cost of energy, the refining of the glass at a location near a major population center substantially increases the cost of glass production as the energy cost is higher at the production site than, in general, it is at the more remote location where the raw materials are available.

More significant, even, than the inconvenience and cost of transporting the glass materials to the location near a large population center is the problem of polution control. The refining of glass inherently produces both gaseous and solid by-products which are generally lost from the refining furnace up the stack. Glass manufactures go to great lengths to control this pollution. Obviously, the lengths to which the glass manufacturers have gone in order to control the pollution to the degree possible, is a further economic factor adding to the cost of the finished glass product.

A process which would reduce the shipping costs and reduce the problem of pollution control would be extremely desirable.

BACKGROUND OF THE INVENTION

The subject of glass refining and utilization of that glass in finished products has been the subject, obviously, of a great deal of literature and many issued patents. Few, if any, of these have dealt with the problems of pollution control, i.e. the decrease of solid emissions from the stack, and raw material transportation from the standpoint of finding a technically acceptable way to reduce each.

Certain prior art patents have dealt with the utilization of a two-step process for formation of glass, particularly to improve the quality of that glass, but these have not dealt with the problems discussed here.

For example, a number of patents describe the formation of pellets of the materials employed in the formation of glass in order to improve the uniformity of the glass batch, and, thus, the overall quality of the glass produced. These include, for example U.S. Pat. Nos. 1,543,770, Hilbert; 2,062,907, Jeffery et al; 2,366,473, Bair; and 2,970,924 Fox et al.

U.S. Pat. No. 3,573,887, Mod et al., describes a similar process where, in addition, the bar or rod which is formed of the raw materials for the glass batch is refined at about 1600° to 1700°C and the thus refined glass is either stored for later use or is formed into particles for later processing. In a manner similar to Mod et al., McKinley, U.S. Pat. No. 1,646,488 describes the formation of cullet in a first processing stage, followed by melting of this cullet and its use in forming glass sheets.

None of these prior art patents has shown a method for reducing transportation costs, and reducing pollution near large population centers in a glass article manufacturing process.

SUMMARY OF THE INVENTION

In accordance with the present invention, it has unexpectedly been discovered that glass articles can be produced from standard glass raw materials in a two-step process, where the first step refines the glass to from about 60 to 95% of the fully refined state, and the semi-refined glass is cooled and formed into particles. Preferably, this semi-refining operation is carried out in an area remote from large population centers and near sites where the raw materials are readily available. The semi-refined granules are then sent to a second location where the melting process is continued in order to complete the refining of the glass and the now molten glass is formed into finished glass articles Preferably, the articles so formed are glass containers, such as, jars, bottles, etc.

As indicated, the semi-refining operation is carried out to from about 60 to 95% of complete refining. Preferably, the refining operation is carried to a degree of completion of from about 90 to 95%, most preferably, from about 90 to 92%. As further indicated, this semi-refining operation is preferably carried out at a location remote from population centers. In general, the primary raw materials of glass manufacturing, a source of silica, a source of alkali, and energy, are more readily available at locations remote from population centers than they are near such population centers. In this way, unnecessary transportation costs are reduced.

The semi-refined glass material is cooled and converted into a granular state. By granular state is meant a group of particles of hetereogeneous size distribution and irregular configuration, much in the manner of rock salt. This cooling and granulation can be carried out by contacting the molten, semi-refined glass with a stream of water.

The granulated, semi-refined glass product is then transported to a glass-forming operation. This forming operation is generally located in the vicinity of a large population center as it is most economical to form the finished glass product in such an area. The finished glass product so formed can be flat glass, but is, more preferably, glass containers, such as jars, bottles, etc. At the glass-finishing operation, the melting operation which acts to refine the glass is continued on the granulated, semi-refined glass product to produce molten, refined glass. The molten glass is fed to the forming machinery or glass maker which may be, as indicated, bottle making equipment.

Because according to the present process the by-products are lost in the remote area, they need not be transhipped to the location where the glass forming operation is located and carried out, thus substantially reducing shipping costs. Still further, the granular, semi-refined glass product is much less susceptible to damage by atmospheric conditions, particularly humidity, as are the major glass raw materials, the source of silica and the source of alkali. Thus, the material which is shipped is more stable, in addition to the other advantages provided.

DESCRIPTION OF THE PREFERRED EMBODIMENTS

In accordance with the present invention, raw materials for the formation of glass are batched in a manner and according to formulations well known in the art. The particular formulation will depend upon the type of finished product which is to ultimately be formed, i.e. containers, tumblers, sheet glass, etc. and the method of batching will, to some extent, be dependent on the raw materials employed. Both the method and the materials are well known to those skilled in the art and need not be detailed here.

Figure 1:
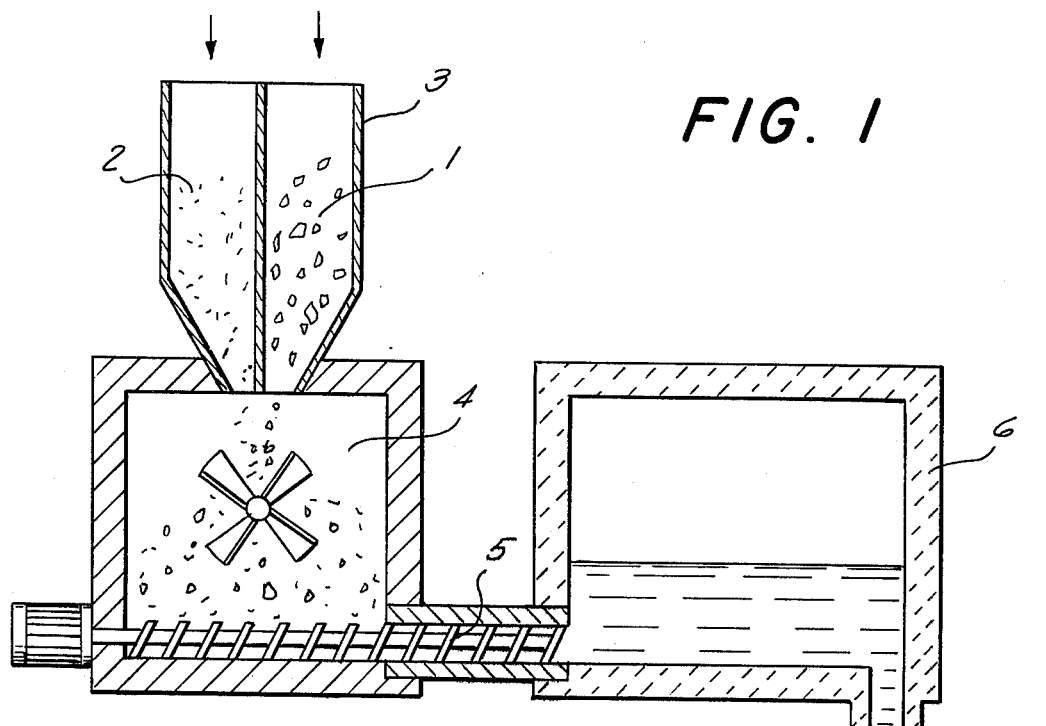
FIG. 1 is a representation of the formation of the granular, semi-refined glass products.

Representationally, and referring to FIG. 1, a source of alkali 1 and a source of silica 2 are fed to a hopper 3. It will, of course, be appreciated that other glass making raw materials, such as, boron containing materials, etc., are also added at this point, if they are desired. From the hopper 3, the raw materials are fed to a mixer 4 where a generally homogeneous mixture of the raw materials is formed. The mixed raw materials are transferred, as by conveyor 5, to a glass furnace 6.

While the melting and refining operation carried out in the furnace 6 is generally similar to that of a standard glass refining process, certain advantages in the operation of the furnace are gained by employing the process of the present invention. In present glass making operations, where the refining furnace and the glass making equipment are located at the same site, the operation of the glass furnace is necessarily dependent upon the through-put possible in the glass making equipment. For reasons of economy, the glass making furnaces in the standard glass plants are generally run at as high a temperature as possible, e.g. 2825° to 2850°F. In order to withstand these temperatures, the glass making furnaces are lined with refractory material. The higher the temperature of melting, the better the quality of the refractory which is required. Even with very high quality materials at these elevated temperatures, there is considerable wear and the refractories must be replaced frequently. However, if the temperatures were reduced substantially, there would not be enough through-put of molten, refined glass to supply the glass making equipment and, as a consequence, finished product manufacture, particular container manufacture, could not be economically carried out.

Because the refining operation is not completed in the first stage according to the present invention, the temperature employed in the glass furnace need not be as high. For that reason, the life of the refractory lining is considerably longer, thus rendering the process more economical. In general, the first stage semi-refining operation would be carried out at a temperature from about 2550° to 2600°F. Under those conditions, not only is the life of the refractory extended, but less energy is required.

Should it be desired to operate the glass furnace in the first stage semi-refining operation at the same temperature as those presently normally used in a one-stage glass forming operation, the higher through-puts are obtained, again resulting in improved economics. While the refractory will still have to be replaced on about the same schedule as with present glass making operations, more through-put will have been achieved.

In the first stage of the glass making process according to the present invention, the glass raw materials are refined to produce from about 60 to 95% of complete refining. Preferably, the material is refined to a degree from about 90 to 95%, most preferably from about 90 to 92%. It is essential at this stage that the glass not be fully refined, the fully refined glass which is not used in the finished product being defined as cullet. As previously indicated, the process according to the McKinley patent involves formation of cullet at this stage. However, if in this first stage process the glass were fully refined to cullet, then the final glass product, particularly a glass container, would not have the properties desired. As indicated in Modern Glass Practice, Scholes, Industrial Publications, Inc. Chicago (1935), pages 81, 82, skilled glass workers and operators can easily determine the difference between melted cullet and glass formed from raw materials. As indicated in those pages, which are hereby incorporated by reference, when the cullet ratio is too high the glass is stiff or high in viscosity, resulting in a product which is more difficult to work. While not wishing to be found by theory, the article postulates that this is due to the loss of dissolved gasses or the driving out of alkalis in melting of the cullet.

The semi-refined glass product is drawn off the glass furnace in the first stage of the process and is cooled and granulated. One method of accomplishing this cooling and granulation, is by subjecting the stream of molten glass to a stream of water 7 directed into the molten glass 8 as by a jet 9. The solidified, semi-refined glass product 10 is collected in a container 11 for further use in the second stage of the process of the present invention.

Most desirably, for the reasons and as indicated above, the first stage of the process is carried at a remote location near the sources of glass making raw material and away from population centers. The semi-refined glass product 10 is then transported to the glass finishing operation, which, for reasons also set forth above, is generally located near a population center. At the glass finishing operation, which represents the second stage of the process according to the present invention, the melting process is carried out to complete the refining of the product 10 and that molten product is then made into the finished glass product.

Figure 2:
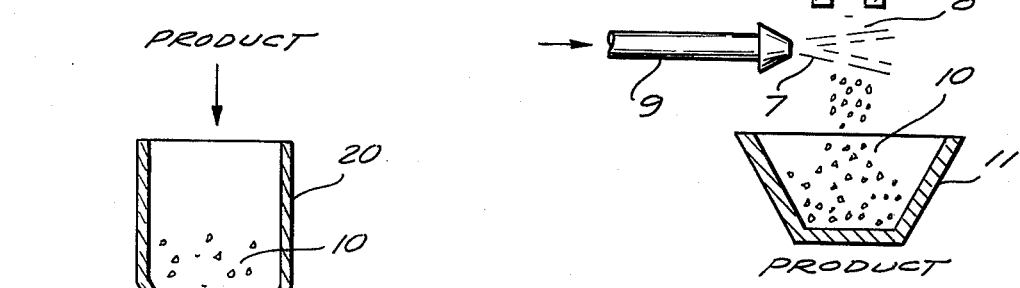
FIG. 2 is a representation of the utilization of the granular, semi-refined glass product for the production of glass containers.
Figure 2:
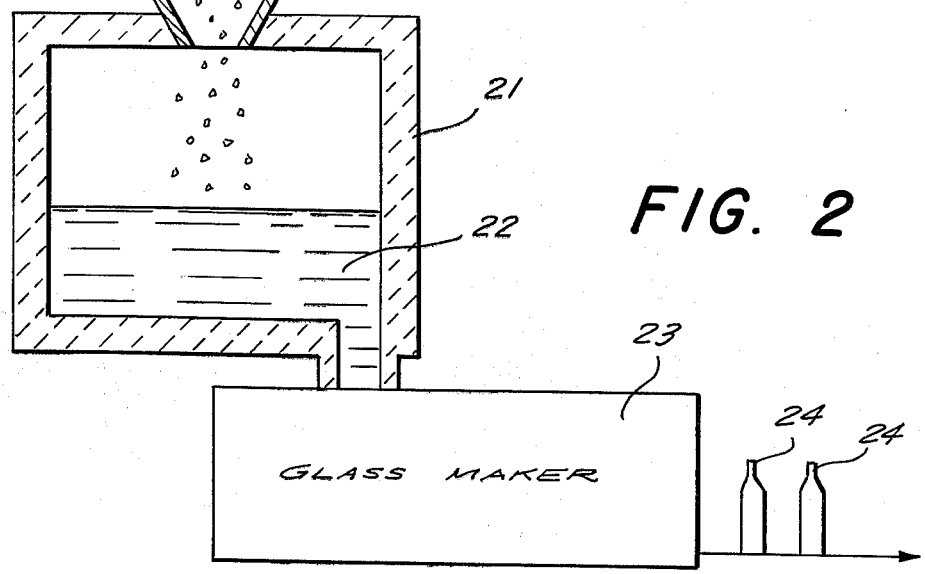

As indicated in FIG. 2, the semi-refined product 10 is placed in a hopper 20. The hopper 20 is shown only for purposes of representation and it is apparent that the semi-refined product 10 may be placed into a glass furnace 21 by any means known to those skilled in the art. The process of the present invention provides a further advantage at this stage of the process. Should there have been some error in formulation of the batch employed for formation of the semi-refined product 10, then another batch can be formulated with a variation in the raw materials so as to compensate for the error in the first batch. These two batches, or additional batches if desired, be mixed in the hopper 20 before continuation of the melting process in furnace 21.

In furnace 21, the melting operation begun in furnace 6 is continued for full refining of the glass product. The molten, fully refined glass 22, is then conveyed by means well known in the art, to glass making equipment 23. The type of glass making equipment employed here is not critical and the types employed are well known to those skilled in the art. As indicated in FIG. 2, the glass making equipment 23 is such as to produce containers shown at 24. While the containers are the product preferably formed by the process of the present invention, it will be apparent that other products, such as, tumblers, etc. can also be formed here.

In accordance with the present invention, a two-stage process has been developed for formation of a glass product from glass raw materials, the raw materials being converted to a solid, semi-refined, granulated glass material in the first stage. Desirably, the first stage and the second stage of the process are carried out at different locations, the overall process resulting in decreased problems of pollution control, more economical utilization of raw materials, improved equipment utilization, reduced energy requirements near population centers, and various other advantages as more particularly pointed out and described above.

The invention should not be considered as limited to the specific examples shown and described, but only as limited by the appended claims.

I claim:

1. A two-stage process for the formation of a glass product comprising:
   a. providing raw materials for a glass product;
   b. mixing said glass raw materials;
   c. melting said glass raw materials and refining to a glass product refined to a degree from 60 to 95%;
   d. cooling said semi-refined glass product and forming said product into granules;
   e. transporting said semi-refined glass granules to a glass finishing operation;
   f. continuing the melting of said semi-refined glass product to provide a fully refined, molten glass; and
   g. forming said fully refined, molten glass into a glass product.

2. The process of claim 1 wherein said semi-refined glass product is made at a location remote from said glass finishing operation.

3. The process of claim 1 wherein the degree of refining is from 90 to 95%.

4. The process of claim 3 where the degree of refining is from 90 to 92%.

5. The process of claim 1 wherein at least two batches of said semi-refined glass are transported to said glass finishing operation.

6. The process of claim 1 wherein the glass product is a glass container.

7. The process of claim 1 wherein the melting of the glass raw materials is carried out at a temperature of from 2550° to 2600°F.

8. The process of claim 1 wherein the cooling and granulation of the semi-refined glass product is accomplished with a water jet.

9. The process of claim 1 wherein the glass product is flat glass.

* * * * *